United States Patent [19]

Gräser

[11] 4,133,870

[45] Jan. 9, 1979

[54] PROCESS FOR PREPARING AMMONIUM SULFAMATE

[75] Inventor: Reinhold Gräser, Frankfurt am Main, Fed. Rep. of Germany

[73] Assignee: Hoechst Aktiengesellschaft, Frankfurt am Main, Fed. Rep. of Germany

[21] Appl. No.: 884,688

[22] Filed: Mar. 8, 1978

[30] Foreign Application Priority Data

Mar. 10, 1977 [DE] Fed. Rep. of Germany ....... 2710399

[51] Int. Cl.² .............................................. C01B 21/54
[52] U.S. Cl. ................................................... 423/388
[58] Field of Search ........................ 423/387, 388, 389

[56] References Cited

U.S. PATENT DOCUMENTS

| | | | |
|---|---|---|---|
| 3,404,950 | 10/1968 | Sasaki et al. | 423/388 |
| 3,484,193 | 12/1969 | Azakami et al. | 423/388 |
| 3,661,516 | 5/1972 | Hofmeister | 423/389 |

FOREIGN PATENT DOCUMENTS

| | | | |
|---|---|---|---|
| 636187 | 2/1962 | Canada | 423/388 |
| 1442976 | 1/1969 | Fed. Rep. of Germany | 423/389 |
| 41-13850 | 8/1966 | Japan | 423/389 |
| 947080 | 1/1964 | United Kingdom | 423/388 |

*Primary Examiner*—O. R. Vertiz
*Assistant Examiner*—Thomas W. Roy
*Attorney, Agent, or Firm*—Curtis, Morris & Safford

[57] ABSTRACT

Ammonium sulfamate is prepared by introducing sulfur trioxide and ammonia into a pressure vessel that contains a melt essentially consisting of ammonium sulfonate and ammonium imido disulfonate using a molar ratio of $NH_3$ to $SO_3$ of 1.5 to 1.99:1. The gases that accumulate on top of the molten phase are not removed from the pressure vessel.

5 Claims, No Drawings

PROCESS FOR PREPARING AMMONIUM SULFAMATE

The present invention relates to a process for preparing under pressure ammonium sulfamate from sulfur trioxide and ammonia.

U.S. Pat. No. 3,484,193 discloses a process for preparing ammonium sulfamate by introducing under pressure ammonia into a melt of ammonium imido disulfonate and ammonium sulfamate and by converting the ammonium imido sulfonate to yield ammonium sulfamate. This process requires as starting product ammonium imido sulfonate.

The process described in German Patent 14 42 976 resembles closely the above cited processing method. Both processes have the disadvantage that they require first the preparation of ammonium imido disulfonate or ammonium nitrido trisulfonate. In the same way, the process according to Japanese application laid open to public inspection No. 7,305,440 (Chem. Abstr. 80, 16121 n) requires a second reaction step, in order to react further to ammonium sulfamate the reaction product resulting from the reaction of $NH_3$ with $SO_3$.

German Offenlegungsschrift 19 15 723 describes a process for preparing ammonium sulfamate which comprises the reaction of sulfur trioxide with an excess of ammonia in the molten phase. This excess of ammonia should, for best results, amount to at least twice the stoichiometric quantity. The excess has to be removed from time to time or continuously from the reaction vessel, of course. While evacuating the excess quantity of ammonia, the simultaneous discharge of molten finely dispersed parts is inevitable. When small apparatus are used, the reaction of sulfur trioxide with ammonia may even continue through to completion, while the gaseous products are evacuated, i.e. in the pipe lines, too. The risk of an undesirable reaction is especially high, when ammonia and sulfur trioxide are not yet fully engaged in the reaction in the liquid phase due to too low a reaction temperature. The droplets of the melt which are carried away with the excess of the gas current solidify upon contact with cooler parts of the apparatus, thus clogging pipe lines and valves.

Separating from ammonia the molten reaction products carried away, requires high technical expenditure. The highly corrosive properties of these reaction products add to the problem.

Therefore, the aim was to provide a process for reacting ammonia with sulfur trioxide to yield ammonium sulfamate and, nevertheless, to avoid the disadvantages of the process described by German Offenlegungsschrift 19 15 723.

A process for preparing ammonium sulfamate has now been found, which comprises introducing sulfur trioxide and ammonia into a pressure vessel containing a melt essentially composed of ammonium sulfamate and ammonium imido disulfonate, and which process is characterized in that a molar ratio of $NH_3$ to $SO_3$ within a limit of 1.5 to 1.99:1 is maintained and that the gases gathering on top of the molten phase are not removed from the pressure vessel.

At that stage of the process the sulfur trioxide is advantageously introduced into the melt, and the melt is agitated vigorously.

The molten phase that is used for the reaction is simultaneously obtained during the process as reaction product. Therefore, it is sufficient to remove the forming melt from the pressure vessel either from time to time or continuously. The conditions for obtaining mixtures of ammonium sulfamate and ammonium imido disulfonate as a melt have been made known by German Patent 14 42 976. The separated melt may be worked up to amidosulfonic acid in known manner. The process proceeds especially advantageously, if ammonia is added in such a quantity that in the gas-filled space on top of the molten phase an ammonia partial pressure of at least 1 bar, preferably of 1.5 to 30 bars, especially of 2 to 15 bars is maintained. The upper limit of the ammonia pressure adjusted in the gaseous phase is not critical and depends on the mechanical strength of the vessel material only. Within the range of from 1 to approximately 30 bars an acceleration of the reaction is observed proportionately to the $NH_3$ pressure. The reaction speed can be enhanced but slightly by increasing the pressure beyond 30 bars. The reaction is carried out with particular advantage by stirring the molten phase thoroughly, so that the reaction of the ammonia enclosed in the gaseous phase with the molten phase may be facilitated.

The reaction runs especially smoothly, when the molar ratio of the reactants ammonia and $SO_3$ is below 1.97 and keeps especially within a range of from 1.5 to 1.95, preferably from 1.6 to 1.9. Under these conditions the process may be carried out under a constant pressure.

Depending on the composition of the melt, the process may be carried out at temperatures of from 120 to 350° C., especially suitable are temperatures of from 200 to 300° C., or even better from 220 to 250° C., preferably from 225 to 235° C.

The space-time-yield of melt in a given reaction vessel is limited first of all by the possibility of evacuating reaction heat set free. This statement is especially true for the use of enamelled pressure vessels. Since the evacuation of the reaction heat via the jacket of the pressure vessel has its limits, it is a useful practice to remove molten phase from the pressure vessel, conducting same through a heat exchanger and to recycle it into the pressure vessel. The molten phase removed from the pressure vessel may be blended with gaseous or liquid sulfur trioxide prior to or after the heat exchanger.

On that occasion it is also possible to introduce into the molten phase, simultaneously with the sulfur trioxide, part of the ammonia to be subjected to the reaction. The molar ratio of the reactants added at this point (ammonia/sulfur trioxide) is advantageously smaller than 1.6, e.g. 1.5 or even smaller. The rest of the ammonia is metered into the molten phase in the pressure reactor.

The reaction takes place essentially at the interface of agitated melt and gaseous phase only. Experience showed therefore, that an advantageous practice consists of introducing the molten mixture finely dispersed, e.g. by atomizing through a nozzle, that has been conducted over the heat exchanger and blended with sulfur trioxide into the gas-filled space of the agitating autoclave. This statement remains also valid in case that part of the ammonia to be reacted is already fed into this mixture. The composition of the reaction mixture, i.e. of the withdrawn molten phase, depends mainly on the quantitative proportion of ammonia/sulfur trioxide used. Reaction products, the ammonia/sulfur trioxide ratio of which may vary from about 1.85 to 1.90, may be prepared with relatively low ammonia pressures and temperatures from 200°–300° C.

The melt contains, in addition to the ammonium sulfamate, essentially ammonium imido disulfonate as by-product only. The ammonia/sulfur trioxide ratio of this compound amounts to 1.5. When working up by hydrolysis, half of the sulfur trioxide portion of the disulfonate gets lost according to the scheme $$(NH_4SO_3)_2 NH + H_2O \rightarrow (NH_4)_2SO_4 + NH_2SO_3H$$

The preparation of melts, the ammonia/sulfur trioxide ratio of which is but slightly inferior to 2, is therefore desirable.

At a pre-determined feed rate of sulfur trioxide, ammonia is also metered in generally at a constant weight ratio. However, it is also possible to control the ammonia consumption by means of the absolute pressure in the gas-filled space on top of the molten phase, i.e. by proceeding under a constant gas pressure.

The equilibrium of (ammonia + disulfonate)/ammonium sulfamate shifts more and more, proportionately to the temperature decrease, in favor of the ammonium sulfamate. However, this equilibrium is achieved slower and slower, proportionately to the decreasing temperature. Therefore, a process on a technological scale requires a compromise insofar to be satisfied with a smaller portion of ammonium sulfamate in view to technically acceptable conversion speeds. Under constant temperature conditions it is possible, however, to increase the portion of ammonium sulfamate in the melt by increasing the ammonia pressure maintained in the space on top of the melt.

By first approximation the composition of the equilibrium is as shown in the following table:

| pressure (bar) | temperature (° C) | | | | | |
|---|---|---|---|---|---|---|
| | 310° | 280° | 250° | 220° | 200° | 180° |
| 1 | 0.50 | 0.57 | 0.68 | 0.78 | 0.81 | 0.87 |
| 2 | 0.61 | 0.69 | 0.80 | 0.86 | 0.88 | 0.93 |
| 5 | 0.72 | 0.82 | 0.88 | 0.93 | 0.95 | 0.96 |
| 10 | 0.85 | 0.89 | 0.94 | 0.96 | 0.97 | 0.98 |
| 20 | 0.91 | 0.91 | 0.97 | 0.98 | 0.98 | 0.99 |
| 50 | 0.96 | >0.97 | >0.98 | 0.99 | >0.99 | — |

The values of the table indicate the molar ratio of ammonium sulfamate: (ammonium sulfamate + ammonium imido disulfonate) in the liquid phase, i.e. they do not take into consideration the minor contents of ammonium sulfate and ammonium nitrido trisulfonate.

This equilibrium is not achieved by technological processes. Therefore, the contents of ammonium sulfamate stated in the table being equilibrated, represent but an upper limit.

The speed at which the equilibrium can be adjusted depends essentially on the reaction temperature, furthermore on the agitation conditions (geometry of the agitator device, agitating speed), the dimensions of the apparatus (proportion of surface/volume of the melt) and on the average residence time.

The molar ratio of the starting products ammonia/sulfur trioxide = v, as it is applied for stationary process conditions, results from the molar ammonium sulfamate (m) content of the melt by means of the equation of $$3 - m/2 - m = v.$$

It is very difficult to calculate exactly in advance the ammonium sulfamate content to be achieved in practice, a difficulty that is due to the dependency upon many parameters. However, the combination of ammonia pressure and temperature best suitable for the reaction can be determined by just a few preliminary tests. At a pre-determined temperature the occuring pressure results from the molar ratio v to be applied, or vice-versa the molar ratio v of the melt results from the ammonia pressure applied.

The process of the invention can be easily carried out continuously by removing the melt that is formed, proportionately to its being formed anew by metering in the starting products (ammonia and sulfur trioxide). The process of the invention comprises the advantage that any excess of ammonia need not be removed any more. For that reason there may be dispensed with all purification steps, and especially no more clogging or destruction of the pipe lines for discharged ammonia will occur. Another advantage resides in the fact that melts may be obtained containing but little ammonium imido disulfonate. Since only half of the sulfur contained in the disulfonate participates in the reaction upon work-up of the ammonium sulfamate, that means at the same time a good efficiency rate of the sulfur trioxide used.

In view to the statements of page 3, lines 1–4 of German Offenlegungsschrift 19 15 723, it is surprising that sulfur trioxide may be reacted successfully even with a deficiency of ammonia.

The following examples illustrate the process according to the invention:

EXAMPLE 1

35 kg of ammonium sulfamate are melted in a 40 l autoclave with agitator, while introducing ammonia gas. The product melted at 150° C. without essential decomposition. 5 kg of gaseous sulfur trioxide and 3.3 kg of gaseous ammonia were now introduced per hour into the melt being agitated vigorously. A large part of the ammonia that had been introduced left the gas chamber of the reactor again via a pressure-keeping valve that opened upon reaching a pressure of 6 bar. The temperature of the melt increased to 220° C. within a few minutes from the start of the SO₃ addition. At that stage of the process the pressure keeping device (pipe line for carrying-off the non-consumed ammonia and pressure-keeping valve) was already clogged almost entirely by solid reaction product. Even though the valves and pipe lines were carefully heated to temperatures by far exceeding the setting point of the melt, this inconvenience could not be overcome. Therefore, it was impossible to pursue continuous tests.

EXAMPLE 2

(according to the invention)

35 kg of ammonium sulfamate are melted in a 40 l autoclave with agitator, while introducing ammonia gas. The product melts at 150° C. without noteworthy decomposition. 7.5 kg of sulfur trioxide are now introduced per hour into the melt being agitated vigorously. A rate of 2.5 kg per hour of ammonia is simultaneously fed into the gas-filled space on top of the melt. The temperature of the melt rises rapidly to 220° C. At the same time the content of the autoclave is cooled by a mixture of diphenyl/diphenyloxide. The temperature of this mixture is adjusted to 128° C. which corresponds approximately to the setting temperature of the melt. At a melt temperature of 220° C. the process can be carried out continuously, while a constant pressure of 6 bar is established in the gas-filled space. An hourly rate of about 10.2 kg is discharged from the reactor of a melt containing an average of 85 weight % of ammonium sulfamate, 10% of ammonium imido disulfonate, 4.8% of ammonium sulfate and 0.2% of free ammonia.

EXAMPLE 3

Example 2 is repeated, however some melt is removed continuously from the autoclave and fed back into the gas chamber of the reactor by means of a pump. In this manner the reactor content is circulated about 20 times per hour. While this circulation is going on, the total sulfur trioxide (7.5 kg per hour) is introduced under pressure into the melt in circulation. The type and quantity of the reaction product obtained are identical with those of Example 2.

What is claimed is:

1. Process for preparing ammonium sulfamate by introducing sulfur trioxide and ammonia into a pressure vessel that contains a melt essentially consisting of ammonium sulfamate and ammonium imido disulfonate, which comprises maintaining a molar ratio of $NH_3$ to $SO_3$ of 1.5 to 1.99:1 maintaining an ammonia partial pressure of above 1 bar in the gas-filled space of the pressure vessel, and refraining from removing the gases that accumulate on top of the molten-liquid phase, from the pressure vessel.

2. Process according to claim 1, which comprises operating at reaction temperatures of 120 to 350° C.

3. Process according to claim 1, which comprises removing some molten phase from the pressure vessel, blending it with gaseous or liquid sulfur trioxide and feeding it back into the pressure vessel.

4. Process according to claim 3, which comprises introducing the molten phase fed-back into the pressure vessel in a finely dispersed form.

5. Process according to claim 3, which comprises conducting the molten phase removed from the pressure vessel through a heat exchanger, either prior to or after addition of the sulfur trioxide, in order to carry off the heat.

* * * * *